April 18, 1967   A. R. KNAUER ETAL   3,314,410
WHEEL DRESSING MACHINE
Filed July 6, 1964   2 Sheets-Sheet 2

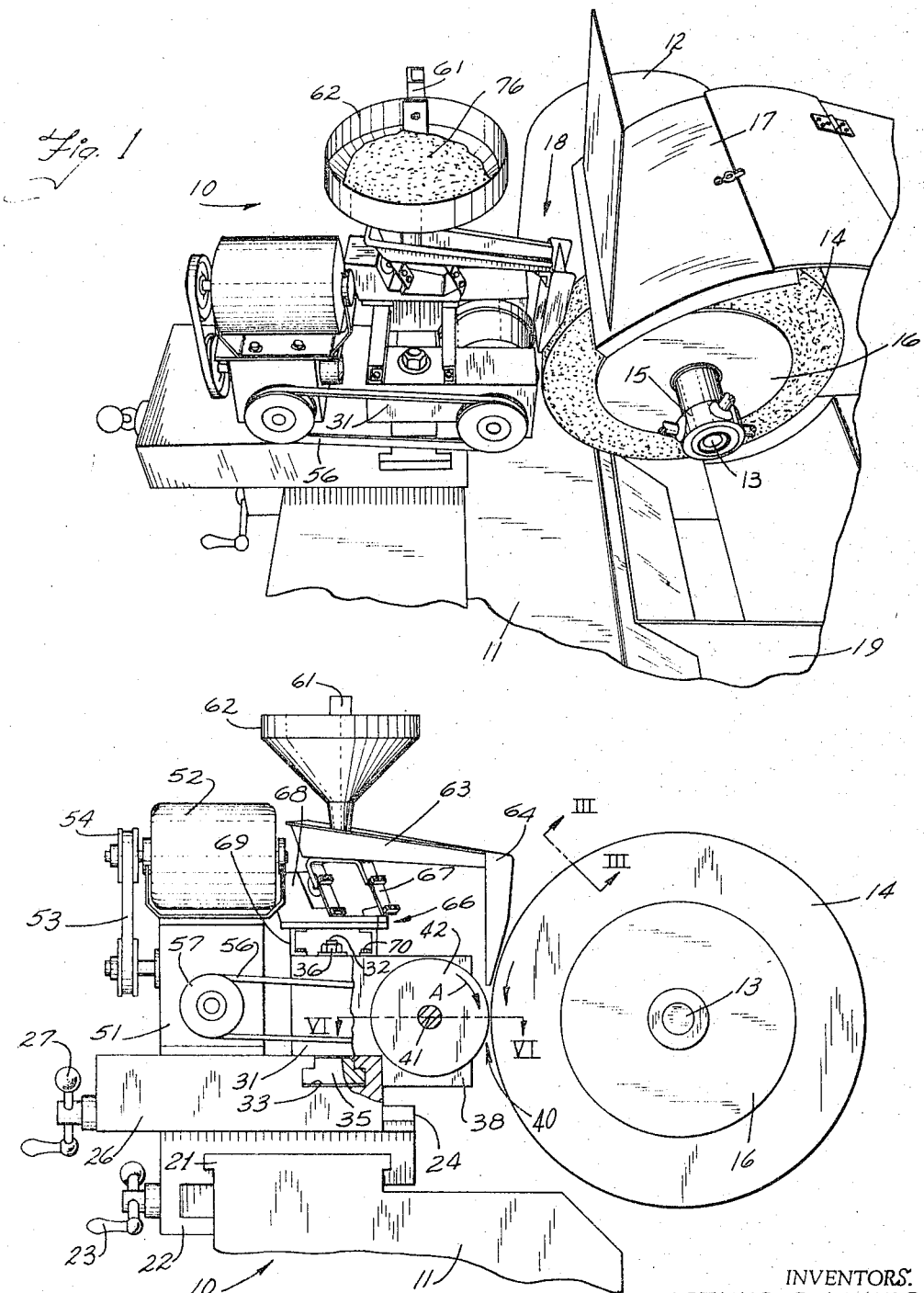

INVENTORS
ARTHUR R. KNAUER
BY JOSEPH B. STINSON
Woodhams, Blanchard & Flynn
ATTORNEYS United States Patent Office 3,314,410
Patented Apr. 18, 1967

3,314,410
WHEEL DRESSING MACHINE
Arthur R. Knauer, Dearborn, Mich., and Joseph B. Stinson, Fremont, Ohio, assignors to Frank Bancroft Company, Inc., Dearborn, Mich., a corporation of Michigan
Filed July 6, 1964, Ser. No. 380,572
16 Claims. (Cl. 125—11)

This invention relates to a method and apparatus for finishing, and/or dressing, a grinding wheel and, more particularly, relates to a method and apparatus for finishing a grinding wheel during the manufacturing of said wheel.

In the manufacturing of grinding wheels, it has long been a standard practice to mix the bonding material and grit from which the grinding wheel is to be made and to then put the mixture into a mold wherein the bonding material is suitably sized and shaped, after which it is cured, usually out of the mold, to form the wheel. The bonding material and grit form a common surface which, in the molding step, continuously contacts the wall of the mold. As a result, the newly molded grinding wheel upon being removed from the mold will have a relatively smooth surface wherein the grit does not extend beyond the surface of the bonding material and wherein the exposed grit is surrounded to a great extent by bonding material. This smooth surface is maintained in the curing step. Such a newly molded and cured wheel, if not further treated, will be, at least for the first several moments of use, substantially ineffective for grinding a workpiece. Actual grinding of the workpiece will not take place until the workpiece has worn down the bonding material sufficiently to expose the grit. Moreover, it has often been found that a wheel started in this manner never does cut as effectively as it should.

In recognition of the need for means and apparatus for properly finishing a new grinding wheel, particularly on the periphery thereof, it has been common practice in recent years to use a rotatable cup-shaped steel tool for initially roughening, or opening, the surface of a new wheel. More specifically, the new wheel is rotated and the cup-shaped tool is moved axially across the peripheral surface of the wheel while exerting radial pressure thereagainst to work down the bonding material and expose the grit more fully. Wheels so treated have generally been capable of more efficient cutting action at least during their initial use. However, this method has been found to be relatively expensive since the tools wear rapidly due to abrasion by the grinding wheel periphery. For example, as many as one-half dozen of these cup-shaped steel tools may be consumed in finishing a single large wheel.

In addition to the foregoing, there is also the frequently occurring problem of assuring concentricity of the grinding wheel. Unavoidable variations in either or both of the molding and curing steps above mentioned but especially the curing (heating) step, often result in a wheel which is slightly eccentric. This also requires the treatment above described in connection with opening the surface of the wheel for "trueing" same to render it concentric. Former methods, such as that above described, have been effective only to a limited extent and particularly not with wheels having very hard bonds, such as wheels used for grinding ball bearings. Hence, the maximum speeds of such wheels when in use have necessarily been limited by such eccentricity with resultant limiting of the production derivable therefrom. This necessity for trueing the wheel may also arise during use thereof.

Accordingly, the objects of this invention include:

(1) To provide an improved method and apparatus for finishing, or dressing, and trueing a grinding wheel, either during manufacture thereof or during subsequent use.

(2) To provide a method and apparatus, as aforesaid, by means of which the bonding material in the surface of a newly molded grinding wheel may be reduced below the level of the adjacent abrasive grits bonded thereby for exposing at least the radially outermost parts of said grits whereby said wheel is immediately capable of a satisfactory grinding action.

(3) To provide a method and apparatus, as aforesaid, which eliminates the relatively expensive rotatable steel cones and the diamond wheels of previous methods and in which machined or otherwise prepared parts of the apparatus are subjected to substantially negligible wear and, hence, seldom require replacement due to wear.

(4) To provide a method and apparatus, as aforesaid, wherein conventional machined parts of the apparatus do not directly bear on or perform the reduction of the surface bonding material of the wheel to be finished and in which the direct contact and reduction of the exposed surface of the bonding material is performed by finely divided particles impressed thereagainst.

(5) To provide a method and apparatus, as aforesaid, suitable for finishing grinding wheels having a wide variety of grit sizes, shapes, spacings and materials and a wide variety of bonding materials with no change in the apparatus or with minor and readily made adjustments of the apparatus employed.

(6) To provide a method and apparatus, as aforesaid, which is also capable of changing the axial profile of an unfinished wheel, to provide a finished wheel which is both initially roughened and has a precisely shaped surface and which is capable of precisely repeating such a shape in a long succession of similar wheels.

(7) To provide a method and apparatus, as aforesaid, which is capable of using a wide variety of particulate materials, which is adaptable for finishing both the periphery and face of grinding wheels, which is capable of finishing a grinding wheel rapidly and which is capable of successful operation by a relatively unskilled operator.

(8) To provide an apparatus, as aforesaid, which can be economically produced from readily manufactured and/or widely available parts and which is readily adapted to both new and existing grinding wheel rotating machines.

(9) To provide an apparatus, as aforesaid, which is capable of a long effective service life with little or no maintenance and which is easily maintained by existing personnel with little or no instruction.

(10) To provide an apparatus, as aforesaid, which will be effective, simultaneously with the roughening of the grinding wheel, to render same concentric within close limits of accuracy.

(11) To provide an apparatus, as aforesaid, which will be applicable both to the finishing of a grinding wheel during manufacture thereof and to the dressing of same following use of same.

Other objects and purposes of this invention will be apparent to persons acquainted with apparatus of this general type upon reading the following specification and inspecting the accompanying drawings.

In the drawings:

FIGURE 1 is a fragmentary oblique view of a grinding wheel dressing machine embodying the invention.

FIGURE 2 is a fragmentary side elevational view of the machine of FIGURE 1.

Figure 3:
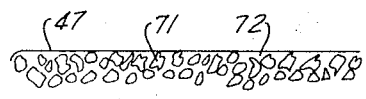
FIGURE 3 is a highly enlarged fragmentary sectional view essentially as taken on the line III—III of FIGURE 2 and showing the surface configuration of a newly molded and undressed grinding wheel.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. The term "dressing" will include finishing of a grinding wheel during manufacture thereof both to expose the grit therein and simultaneously to render same concentric and will also include restoring, reshaping and resurfacing of a grinding wheel from time to time during normal use of same. Said terminology will include the words above specifically mentioned, derivatives thereof and words of similar import.

GENERAL DESCRIPTION

In general, the objects and purposes of the invention are met by providing a method for dressing and shaping the periphery and/or face of a grinding wheel. The method for dressing the periphery of a grinding wheel includes mounting the grinding wheel to be dressed and an adjacent opposed roller for rotation about parallel axes and inserting preferably irregularly shaped particles of material harder than the binding material of the wheel and the periphery of the roller into the nip therebetween. The wheel is rotated in a direction to assist movement of particles through the nip and said wheel and roller are moved toward each other until said particles are forced by said roller against the wheel with sufficient force as to reduce the diameter of the surface of the body material and, hence, to expose the grit of the wheel. The peripheral speeds of the wheel and roller preferably are maintained slightly different so that the particles tend to rotate slightly in the nip.

The apparatus for dressing the periphery of a wheel and embodying the invention comprises means for rotatably driving the wheel to be dressed and horizontally adjustable positioning means for rotatably mounting a roller whose peripheral surface configuration complements that desired in the finished wheel. The roller and wheel are radially opposed to each other and said adjustable means allows movement of the roller toward the wheel. Brake means are connected to the roller to maintain the peripheral speed thereof slightly below that of the wheel. The peripheral speeds of the wheel and roller are directed so that opposed points on the peripheries thereof are moved downwardly. A particle feeding device drops particles of an irregular configuration and of material harder than the bonding material of the grinding wheel into the nip between the wheel and roller.

DETAILED DESCRIPTION

Figure 7:
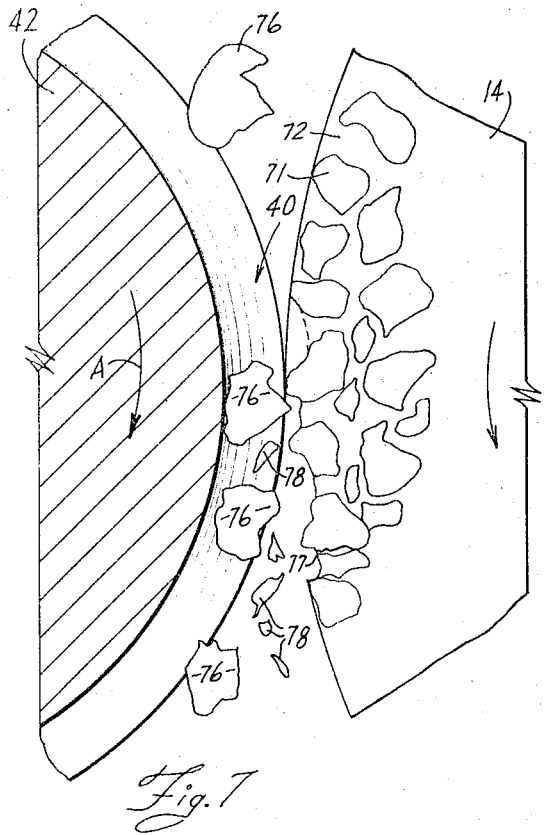
FIGURE 7 is an enlarged sectional view taken substantially on the line VII—VII of FIGURE 6.

The machine 10 (FIGURES 1 and 2) chosen to illustrate the invention is intended for dressing the periphery of a grinding wheel. The machine 10 includes a fixed base 11 on which is supported a drive motor 12 having a rotatable output shaft 13. A newly molded grinding wheel 14 which is to be initially dressed is fixed for rotation upon the shaft 13 by a collar 16 held by a nut 15. The drive motor 12 is energizable to rotate the wheel 14 in a counterclockwise direction as seen in FIGURES 1, 2 and 7. Shielding generally indicated at 17 preferably surrounds at least part of the wheel 14 except for the wheel dressing area generally indicated at 18. A container 19 is provided below the wheel 14 for receiving material resulting from and involved in the dressing of the wheel 14.

The base 11 includes ways 21 which support a cross slide 22 for reciprocation in a direction parallel to the axis of the grinding wheel 14. A hand crank 23 is manually actuable to locate the cross slide 22 axially of the grinding wheel 14. The cross slide 22 mounts preferably horizontal ways 24 on the top thereof which are preferably perpendicularly aligned with respect to the ways 21. An infeed slide 26 is slidable on the ways 24 for movement toward and away from the grinding wheel 14. A hand crank 27 on the infeed slide 26 is adjustable to move the infeed slide 26 along the ways 24.

An axially spaced pair of mounting members 31 is affixed to the top of the infeed slide 26 adjacent the grinding wheel 14. A stud 32 passes downwardly through each mounting member 31 near the leftward end thereof. The lower ends of the studs 32 are fixed to generally T-shaped keys 35 which lie in a T-shaped slot 33 in the infeed slide 26, said slot 33 being parallel to the axis of wheel 14. The studs 32 are terminated at the upper ends thereof by nuts 36. The rightward ends of the members 31 overhang the infeed slide 26 and have depending portions 38 which abut the rightward end of the infeed slide 26 to positively prevent leftward movement of the members 31 with respect to the infeed slide 26. The depending portions 38 have a sufficient axial width in contact with the slide 26 as to keep the leftward portion of the members 31 parallel to each other and perpendicular to the slot 33. Thus, tightening of the nuts 36 fixes the members 31 at any desired spacing and in parallelism. The rightward ends of the members 31 rotatably support a shaft 41 which in turn supports a roller 42 for rotation therewith. The roller 42 is radially and preferably horizontally aligned with the grinding wheel 14 so that a sufficient rightward movement of the infeed slide 26 will move the roller 42 into close adjacency with the periphery of the grinding wheel 14 to form a nip 40 therebetween. The roller 42 has a peripheral cross section which is the complement of the desired peripheral cross section of the finished grinding wheel 14. In the particular embodiment shown, the roller 42 (FIGURE 6) has a substantially cylindrical central peripheral portion 43. Flanges 44 extend radially outwardly past the central portion 43 at the axial ends thereof and are joined to said central portion 43 by enlarged fillets 46. The flanges 44 are axially spaced sufficiently to allow the snug insertion therebetween of the grinding wheel 14 whereby the periphery 47 of the grinding wheel 14 closely approaches the central portion 43 of the roller 42 by appropriate adjustment of the infeed slide 26.

A speed changing device such as the gear box 51 is supported on the infeed slide 26 to the left (FIGURES 1 and 2) of the members 31. The gear box 51 supports a brake 52, here comprising an electric motor, and is connected to said motor brake 52 through a belt 53 and suitable pulleys 54. The gear box 51, in turn, connects to the rotor supporting shaft 41 through a belt 56 and suitable pulleys 57. The motor brake 52 is energized through any convenient control means, not shown, preferably of a type capable of varying the output torque of the motor brake 52 through a range of values. The motor brake 52 is energizable to retard at least clockwise rotation of the roller 42. In a particular embodiment, the roller 42 was substantially smaller in diameter than the grinding wheel 14 and was, in fact, one-third the diameter of said grinding wheel.

An upright 61 supports a downwardly convergent funnel-shaped hopper 62 above the mounting members 31 in a fixed position with respect to the base 11. A vibrating conveyor or chute 63 is located beneath the outlet of the hopper 62 and slopes downwardly toward the grinding wheel 14 to a point located above the rightward face of the roller 42. A tubular guide 64 depends from the rightward end of the chute 63 and terminates at a point somewhat above the center of the roller 42. Thus, when the infeed slide 26 is moved rightwardly toward the grinding wheel 14 such that the roller 42 and wheel 14 are adjacent, the guide 64 will be located above and close to the nip 40. The chute 63 is supported on a vibrator energizer 66 comprising a pair of leaf spring elements 67 and a vibrator motor 68 capable of producing small amplitude reciprocating motion of chute 63. A pair of channels 69 are removably mounted by screws 70 on the leftward portions of the members 31 and support the energizer 66 thereupon. The channels 69 preferably include means for allowing the spacing of the members 31 to be varied, such means including, for example, slotted holes therein for accommodating the screws 70 so that a loosening of the screws 70 will allow such spacing to be varied.

OPERATION

Figure 4:
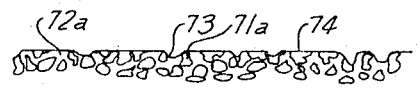
FIGURE 4 is a view similar to FIGURE 3 and showing the surface configuration of a grinding wheel dressed by a prior art method and apparatus.

It has long been a practice in the manufacture of grinding wheels to place a mixture of abrasive grits and bonding material in a suitable mold which cures to yield a grinding wheel. This and similar methods of manufacture generally yield a wheel having a peripheral cross section such as that shown in FIGURE 3 wherein none of the grits 71 extend beyond the boundary of the binding material 72. It will be apparent that the grinding wheel of FIGURE 3 will not function efficiently until the surface of the bonding material is reduced to more fully expose the peripheral grits 71. The results of a prior art attempt to effect such reduction are illustrated in FIGURE 4. Here bonding material 72a was removed to a limited extent from between adjacent grits 71a and below the average surface level of the wheel to more fully expose the grits at only a small percentage of sites 73. Over most of the wheel periphery, the primary effect was the reduction of the over-all diameter of the grinding wheel, i.e., the simultaneous, even reduction of the effective diameter of both binder and grit mass. Hence, most of the exposed grits 71a have peripheral surfaces which are flush with the outer surface of the binder. Thus, few of the exposed grits project outwardly from the binder and the grinding wheel of FIGURE 4 will be relatively inefficient because few of the exposed grits will do any cutting.

Turning now to the operation of the present invention, a newly molded and cured grinding wheel 14 is fixed upon the shaft 13 by the collar 16 and nut 15. A roller 42 of the desired material, diameter and peripheral cross section may be installed on the apparatus by placement of said roller between the rightward ends of the members 31 and insertion of shaft 41 through said members and said roller, any convenient means such as a key, not shown, being used to assure rotation of the roller 42 with the shaft 41. Thereafter the belt 56 may be made to engage the pulleys 57 thereby connecting the shaft 41 ultimately to the motor brake 52. If desired, a roller of different axial length may be installed for accommodating grinding wheels of varying axial widths. Such installation may be accomplished by loosening the nut 36 on the member 31 farthest from belt 56 and releasing the screws 70 holding the channels 69 on one or both of the members 31. The members are then separated by the required distance. If necessary, the channels 69 may be repositioned slightly on the members 31 to correctly locate the guide 64 axially of the new roller. After the apparatus has been so assembled, particles 76 of any desired type are placed in the hopper 62 and allowed to run out the bottom end thereof and into the chute 63. Energization of the vibrator motor 68 causes the particles to move along the chute 63, into the guide 64 and into the nip between roller 42 and grinding wheel 41.

With the energization of the motor 12, the wheel 14 is caused to rotate in a counterclockwise direction (FIGURES 1 and 2) whereby the portion thereof nearest the roller 42 has a substantially downwardly directed peripheral velocity. After centering the roller 42 axially with respect to the grinding wheel 14 by appropriate manipulation of hand crank 23 on the cross slide 22, the crank 27 is actuated to move the infeed slide 26 and, hence, the roller 42, radially inwardly towards the wheel 14. This movement is continued until an increase of impedance thereto is encountered which is sufficient to indicate that the roller 42 is pressing the particles 76 against the periphery of the grinding wheel 14 with a desired force. The wheel 14 tends to frictionally drive the roller 42 through the particles 76 to effect clockwise rotation thereof as indicated at arrow A in FIGURES 2 and 7. The motor brake 52 is then energized to exert a counterclockwise torque on the roller 42 sufficient to reduce the peripheral speed thereof slightly below that of the wheel 14.

The particles 76 are of preferably irregular shape as indicated at FIGURE 7 and may be of any suitable material harder than the bonding material of the grinding wheel 14. The particles 76 may be, for example, split steel shot or abrasive particles having suitable configurational, hardness and strength characteristics. For example, particles of silicon carbide and aluminum oxide have been successfully used. The particles 76 are preferably less hard and strong than the grits 71. The peripheral surface of the roller 42 is preferably somewhat softer than the material of the particles 76. For example, wheels of both brass and soft steel have been used in actual practice. The method and apparatus of the invention has been found applicable to grinding wheels independently of the grit therein and which include bonding agents such as resinoid and vitrified materials, shellac, rubber and silica binding materials and even types of metal bonded wheels (e.g., bronze wheels). Hence, the method and apparatus are believed applicable to nearly any type of grinding wheel. It has been found that the particles 76 may be of any desired size, the smaller particles doing a more precise job of relieving the bonding material but often having a shorter useful life.

Considering FIGURE 7, it will be apparent that the particles 76 falling into the nip between the roller 42 and wheel 14 are subjected to a compressive force thereby and, hence, are pressed by the roller 42 against the periphery of the grindiing wheel 14. This force, plus the irregular shape of the particles 76, causes said particles to penetrate the bonding material 72 between the grits 71. It has been found that performance is optimized with the roller 42 having a peripheral speed somewhat different than that of the wheel 14. While in the embodiment shown, the roller peripheral speed is lowered by the motor brake 52, it is contemplated that means might be provided to rotate the roller at a peripheral speed faster than that of the wheel. In one particular embodiments, a 24-inch diameter wheel was rotated at 120 r.p.m. and an 8-inch diameter roller was braked to run at about 300 r.p.m., thus resulting in an approximately 18 percent peripheral speed difference.

It is believed (though the effectiveness of the invention does not require) that this peripheral speed difference results in a rotation of the particles about axes therethrough (clockwise in FIGURE 7) as they are pushed into the binding material 72 at the nip 40. The rotating particles have a peripheral speed due to rotation which is only a small fraction of that of the roller 42 of wheel 14 and which would appear to have an average maximum value equal to one-half the difference in the peripheral speeds of said roller and wheel. The torque on the particles which tends to result in such rotation and which occurs while they are being pushed into the bonding material is believed to contribute to the removal of bonding material 72 from the wheel 14. Such torque would appear to cause the particles 76 contacting the bonding material 72 to exert tangential forces thereupon in addition to the radial forces of compression, said tangential forces appearing to assist in removal of bonding material from the wheel 14.

The compressive force on the particles 76 is maximized when the particles are brought to the narrow point of the nip 40 and falls off as the nip is passed, finally allowing the particles 76 to disengage the wheel 14. The particles 76 leave relieved portions such as those indicated at 77 in the surface of the bonding material. Particles 76 and chips 78 or other material displaced from the grinding wheel 14 fall from the nip downwardly and, referring to FIGURE 1, into the container 19. This material may be reused by simply replacing it in the hopper 62.

The grits 71 are not significally affected, in comparison with the bonding material 72, by the action of the particles 76 in the nip 40 since the grits 71 are preferably of a hard and relatively tough material and, hence, are not usually eroded significantly by the passage of particles 76 therepast. Moreover, the exposed portions of the grits 71 are relatively small compared with the remainder thereof disposed in the bonding material and said grits are generally of an irregular shape whereby displacement thereof within the bonding material is much less easily achieved than is displacement of exposed portions of the bonding material by the edges of the particles 76. Thus, the grits 71 are substantially unaffected while the surrounding bonding material 72 is reduced.

The microscopic effects by which bonding material is removed is believed to depend to some extent on the bonding material itself. Thus, for example, reduction of a relatively brittle bonding material may include a flaking or chipping action such as indicated in FIGURE 7 wherein the particles 76 remove chips 78 from the peripheral surface of the wheel 14. Depending on the precise nature of the bonding material employed, such chips may be comparable in size to the volume of material contained between adjacent grits 71 or may be much smaller. Powdering of the bonding material during reduction may occur where, for example, the unit pressure of the relatively sharp points and edges of the particles 76 against the surface of a hard bonding material is sufficiently high as to locally pulverize the bonding material. In a relatively soft bonding material, removal may result from penetration of the particle 76 through the surface of the bonding material causing bonding material between the grits 71 to be compacted and/or displaced to produce a depression between grits when the particle 76 falls away. Other bonding materials may be removed as a result of repeated laceration or by material fatigue due to overworking thereof. Moreover, it is fully contemplated that some of the microscopic effects occurring have not yet been perceived and that more than one may occur in the dressing of a single wheel. In any event, the macroscopic effect of material removal has been clearly established whatever the microscopic mechanism resulting in such removal.

The depth to which the bonding material is removed is a function of the size of the particles 76 at least until these become larger than the grits 71. On the other hand, finer particles 76, while not capable of reducing the bonding material as far below the radially outer ends of the grits, are capable of more finely finishing a wheel by removing more of the bonding material, particularly small pockets thereof, from the surface of the wheel which larger particles might be incapable of removing. Further, more fine particles may operate at one time in the nip.

In time, the particles 76 may be reduced in size by constant recycling through the nip 40. Excessively fine particles may be screened out or used batches of particles may be replaced, if desired, to maintain a desired average particle size.

As the reduction of the bonding material 72 proceeds, the compressive force on the particles may gradually diminish from the initially selected and generally optimum value. Thus, it may be desired to move the infeed slide 26 toward the wheel 14 in steps during dressing to restore the compressive force on the particles to an optimum value. More desirably, a constant inward force might be maintained on the infeed slide 26 to maintain a constant compressive force on the particles. In the particular embodiment shown, this can be accomplished by exertion of a continuing torque on the hand crank 27 by the operator. The use of automatic means, such as, for example, a continuously energizable pressure fluid cylinder bearing inwardly on the infeed slide 26 is, of course, fully contemplated.

Some of the particles 76 may in time tend to pit or become embedded in the surface of the roller 42. Since the particles 76 are in practice small compared to the size of any machined contours on the roller 42, the configuration of the roller is not significantly altered. It is believed, moreover, that the resulting textured surface increases the grip of the particles 76 against the roller 42 to more positively rotate the particles as they pass through the nip 40. It has been found in practice that the macroscopic size and shape of the roller 42 is not significantly changed over long periods of use. For example, one roller dressed more than 50 grinding wheels without any perceivable change in the efficiency of its operation or in its size or shape.

Figure 5:
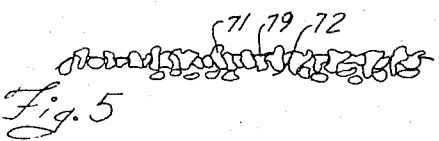
FIGURE 5 is a view similar to FIGURE 3 and showing the surface configuration of a grinding wheel after initial dressing by the method and apparatus embodying the invention.

The result of the action of the particles 76 on the peripheral face of the wheel 14 is indicated in FIGURE 5 which shows the peripheral cross section of a finished wheel. Not only are the grits 71 exposed but said grits extend outwardly beyond the reduced surface 79 of the bonding material 72. It will be apparent that the wheel of FIGURE 5 will be capable of a far faster and more effective cutting action than the wheels of FIGURES 3 and 4.

Figure 6:
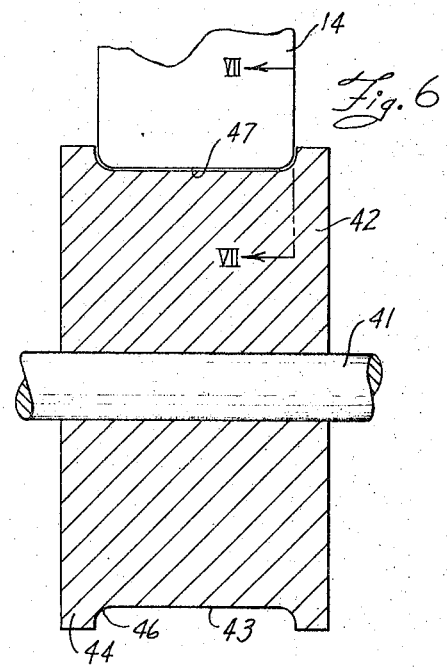
FIGURE 6 is an enlarged sectional view taken substantially on the line VI—VI of FIGURE 2.

The roller 42 of FIGURE 6 is contoured on its periphery to change the peripheral contour of the newly molded wheel 14 during the finishing operation. Although it will be understood that the wheel 14 can be contoured in any desired peripheral shape by this method, the roller 42 is for purposes of illustration equipped to change the contour of wheel 14 only by rounding off the axial edges thereof. To effect this change in contour, the roller 42 is moved toward the wheel 14 with sufficient force that the particles 76 passing through the nip 40 remove not only the binding material 72 but the grits 71 as well from the portion of the wheel periphery to be contoured. The inward force or the infeed slide 26 may not be greater during this action than it is during dressing of the full face of the wheel 14 since the contoured area is small compared to the total peripheral area of the wheel so that unit pressures are greater during contouring than during dressing with the same inward force on the infeed slide 26.

MODIFICATION

Figure 8:
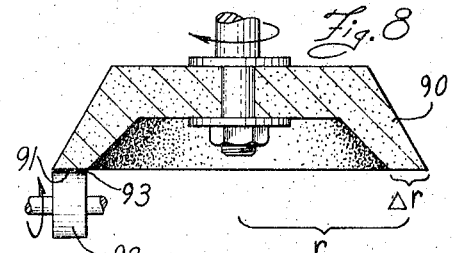
FIGURE 8 is a substantially diagrammatic view of apparatus embodying the invention and arranged for dressing the radial face of the cup-shaped grinding wheel.
Figure 9:
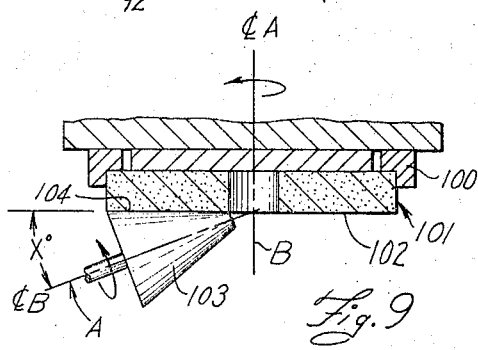
FIGURE 9 is a substantially diagrammatic view showing apparatus embodying the invention for dressing the radial face of a radial grinding wheel.

Although the above discussion has dealt explicity with the dressing of the periphery of a grinding wheel, including rendering same concentric, it will be seen that the same method and apparatus may be used to dress the radial face of a grinding wheel (or a surface of such a wheel including elements having radial components), including rendering same planar and perpendicular to the wheel axis. FIGURES 8 and 9 diagrammatically indicate examples of arrangements for dressing such faces of a grinding wheel.

More specifically, FIGURE 8 discloses a rotatably mounted grinding wheel 90 which is here indicated as a cup-shaped wheel having an annular, radially disposed grinding surface 91 to be dressed. A roller 92 is rotatably disposed with its periphery adjacent the surface 91 for forming a nip 93 therebetween into which suitable particles, not shown, may be injected. The roller 92 is substantially cylindrical and its axis of rotation is perpendicular to that of the wheel 90. Since the average radius R of the annular surface 91 is relatively great compared to the radial width Δr thereof, the range of tangential velocities occurring across the face 91 will be relatively small compared to the average tangential velocity thereof. Thus, the relatively small change in tangential speed across the radial extent of the annular surface 91 allows a speed differential which is substantially constant along the nip 93 to be maintained between the periphery of the roller 92 and the annular surface 91. As a result, the dressing efficiency will be substantially the same along the nip 93 although the peripheral speed of the wheel 92 is not constant along the axial extent thereof.

FIGURE 9 discloses an arrangement for dressing the radial face 102 of a grinding wheel 101 which is substantially independent of the radial extent or location of the area to be dressed. With the wheel mounted for rotation in, and firmly backed by, a suitable rotatable chuck 100, a conical, or more usually a frusto-conical roller 103, is mounted for rotation along an axis A which intersects and lies at an acute angle $x$ to the rotational axis B of the grinding wheel 101. The surface of the roller 103 includes an element which lies closely adjacent to and parallels the radius of the wheel 101 for defining a nip 104 therebetween into which suitable particles, not shown, may be introduced for dressing the wheel in the above-described manner. In the embodiment shown, the axes of the wheel and roller are located to intersect on the line of action defined by the nip 104. However, this geometry may be varied according to the precision desired and according to whether the peripheral surface of the roller 103 is going faster or slower than the surface of the wheel being dressed.

It will also be apparent that wheels may be dressed on conical surfaces as well as radial and circumferential ones within the broad limits of the method and apparatus of the invention.

Although particular preferred embodiments of the invention have been disclosed above for illustrative purposes it will be understood that variations or modifications thereof which lie within the scope of the appended claims are fully contemplated.

What is claimed is:

1. An apparatus for dressing a rotatable grinding wheel which is comprised of grit disposed in a body of bonding material, the combination comprising:
    a roller having a continuous pressure surface movable about the axis of rotation of said roller;
    means for positioning said roller adjacent said wheel so that said pressure surface is opposed to and is closely spaced from a downwardly movable surface of the grinding wheel, said positioning means including means supporting said roller for rotation so that the portion of its pressure surface adjacent the surface of said grinding wheel moves downwardly therewith;
    means for feeding a stream of particles into the space between said pressure surface and said downwardly movable surface of said grinding wheel so that drive force is transmitted from said grinding wheel to said roller through said particles, said roller being caused to rotate by said drive force; and
    means for controlling the speed of rotation of said roller to provide a small differential peripheral speed between said wheel and roller so that said particles are urged to move angularly about substantially horizontal axes in order to press said particles into the bonding material and remove portions thereof from the grinding wheel to expose the grit.

2. Apparatus according to claim 1 including means for continuously urging said roller toward said grinding wheel under a selectable force.

3. The apparatus defined in claim 1 wherein said roller is frusto-conical in shape and has a peripheral surface adjacent and parallel to the adjacent face of the grinding wheel for forming a nip therebetween;
    the axes of said roller and wheel intersecting at a point displaced from the intersection of the line of the nip and said axis of said wheel.

4. An apparatus for finishing an unfinished grinding wheel, including a plurality of grits substantially uniformly distributed throughout a mass of binding material, comprising in combination:
    motor means for rotatably driving said wheel;
    a roller and shaft means for supporting said roller for rotation about an axis parallel to the axis of said wheel and means for relatively moving said roller and said wheel toward each other and for aligning said wheel and roller to form a nip therebetween;
    braking means connected to said roller for maintaining a difference in the peripheral speeds of said wheel and roller within an optimum range of speeds which range is small compared to the peripheral speeds of said roller and wheel;
    a plurality of particles and feed means for dropping particles into the nip between said wheel and roller so that drive force is transmitted from said wheel to said roller by said particles and rotation of said roller is retarded by said braking means;
    whereby said particles are pressed by said roller against the binding material of said wheel to remove said binding material from between said grits at the surface of the wheel.

5. The apparatus defined in claim 4 wherein said axes of said roller and said wheel are horizontal and are horizontally opposed;
    said feed means comprise a hopper, a conveyor fed by said hopper and a substantially vertical guide fed by said conveyor and having a discharge end located above the nip of said wheel and said roller for discharging said particles thereinto;
    said particles are of harder material than said binding material and said roller;
    whereby said particles are capable of penetrating the surface of both said roller and said binding material of said wheel.

6. The apparatus defined in claim 4 wherein said roller is of circular cross section throughout the axial length thereof and where the peripheral surface of said roller is of different radius at different axial points thereon to define an axially varying contoured peripheral surface for contouring said grinding wheel with a complementary axially varying peripheral shape while said wheel is being dressed.

7. A method for dressing the surface of a newly molded grinding wheel including a plurality of grits disposed in a bonding material to produce exposed cutting surfaces of said grits, comprising the steps of:
    rotating the grinding wheel about its central axis;
    feeding particles past a portion of the grinding surface of said grinding wheel;
    positioning a rotatably mounted circular roller in opposed closely spaced relation to said portion of said grinding wheel so that the periphery of said roller presses particles therebetween against said portion of said wheel;
    rotating said roller at a peripheral speed different than the peripheral speed of the wheel, the difference in said peripheral speeds being a small fraction of the individual peripheral speed of each of said wheel and roller so that adjacent points on said roller and grinding wheel move in substantially the same direction and at different speeds so that said particles are urged to move angularly about axes which extend transverse to said direction to cause the particles to reduce the bonding material level to expose more grit surface.

8. A method for dressing the surface of a newly molded grinding wheel including a plurality of grits disposed in a bonding material to produce exposed cutting surfaces of said grits, comprising the steps of:

rotating the grinding wheel about a substantially horizontal axis;

feeding particles downwardly past the downwardly moving portion of the periphery of said grinding wheel;

positioning a rotatably mounted circular roller in opposed closely spaced relation to said portion of said grinding wheel with said particles moving through said space so that said periphery of said roller presses particles therebetween against the periphery of said wheel and drive force is transmitted from said grinding wheel to said roller to effect rotation thereof, said roller being mounted for rotation about a horizontal axis horizontally spaced from and parallel to that of the wheel;

retarding rotation of said roller caused by said drive force so that said roller rotates at a peripheral speed close to but less than the peripheral speed of the wheel, said difference in said peripheral speeds being a small fraction of the individual peripheral speed of each of said wheel and roller, adjacent points on said roller and grinding wheel moving in substantially the same direction and at different speeds so that the particles are urged to move angularly about substantially horizontal axes so that said particles reduce the bonding material level to expose more grit surface.

9. A method according to claim 8 in which periphery of the roller is contoured along its axial extent in a manner which does not complement the initial peripheral configuration of said wheel and in which the initial coaction between the periphery of said wheel and roller causes said wheel to assume a contour complementary to that of said roller.

10. A method according to claim 8 in which said roller is urged toward the periphery of said wheel by substantially constant force to follow the surface of the bonding material as it is reduced; and in which said particles are harder than the bonding material and said roller.

11. Apparatus for dressing a grinding wheel comprising:

a base;

a motor mounted on said base and having a substantially horizontal driven shaft on which the grinding wheel can be mounted;

an infeed slide slideably mounted on said base for movement toward and away from the grinding wheel on said driven shaft and means for moving said infeed slide;

a dressing roller having a continuous pressure surface opposed to and spaced from the grinding surface of the grinding wheel and a dressing roller shaft rotatably mounted on said infeed slide, said dressing roller being mounted on said dressing roller shaft;

a braking motor mounted on said infeed slide and drive means coupling the braking motor shaft to said dressing roller shaft;

a hopper mounted on said infeed slide, positioned above said dressing roller and adapted for holding a supply of particles;

a conveyor above said dressing roller and extending from said hopper to a position over the space between said dressing roller and the grinding wheel;

a guide extending downwardly from said conveyor toward the space between said dressing roller and the grinding wheel for supplying particles into said space.

12. Apparatus according to claim 11, in which said conveyor is a substantially horizontal vibratory conveyor so that the particles are supplied to said guide by substantially horizontal, small amplitude movements of said conveyor.

13. Apparatus according to claim 11, in which said base has a cross slide slideably mounted thereon for movement in a direction lengthwise of said driven shaft, said infeed slide being mounted on said cross slide for movement in a direction perpendicular to the direction of movement of said cross slide.

14. Apparatus according to claim 11, in which said drive means comprises belt and pulley means so that a slippable braking force is applied from said braking motor to said dressing roller shaft.

15. Apparatus according to claim 14, in which said drive means comprises a speed changing device having input and output shafts, belt and pulley means connecting said motor shaft to said input shaft and second belt and pulley means connecting said dressing roller shaft to said output shaft.

16. Apparatus according to claim 11, including a pair of spaced apart supporting members mounted on said infeed slide for independent movement in a direction lengthwise of said driven shaft, said dressing roller shaft extending between and being rotatably supported by said supporting members, said dressing roller being positioned between said supporting members.

References Cited by the Examiner

UNITED STATES PATENTS

| 1,867,939 | 7/1932 | Davenport | 125—11 |
| 2,244,478 | 6/1941 | Tindall | 125—11 |
| 2,560,654 | 7/1951 | Lohutko | 125—11 |
| 2,601,290 | 6/1952 | Hopkins | 125—11 |
| 2,619,950 | 12/1952 | Rickenmann | 125—11 |

FOREIGN PATENTS 1,080,433   4/1960   Germany.

OTHER REFERENCES

Rowan, M. J.: Dressing and Truing Grinding Wheels, McGraw-Hill, New York, received February 1950, p. 6.

HAROLD D. WHITEHEAD, *Primary Examiner.*